US012626509B2

(12) United States Patent
Chen

(10) Patent No.: US 12,626,509 B2
(45) Date of Patent: May 12, 2026

(54) DRIVING RECORDER AND METHOD FOR STORING VIDEO

(71) Applicant: MiTAC Digital Technology Corporation, Taoyuan City (TW)

(72) Inventor: Shu-Ling Chen, Taoyuan City (TW)

(73) Assignee: MiTAC Digital Technology Corporation, Taoyuan City (TW)

( * ) Notice: Subject to any disclaimer, the term of this patent is extended or adjusted under 35 U.S.C. 154(b) by 0 days.

(21) Appl. No.: 18/806,011

(22) Filed: Aug. 15, 2024

(65) Prior Publication Data

US 2025/0061715 A1    Feb. 20, 2025

(30) Foreign Application Priority Data

Aug. 18, 2023    (TW) .................................. 112131114

(51) Int. Cl.
| | |
|---|---|
| *G06V 20/40* | (2022.01) |
| *G06V 10/70* | (2022.01) |
| *G06V 20/56* | (2022.01) |
| *H04N 21/2343* | (2011.01) |
| *H04W 4/44* | (2018.01) |

(52) U.S. Cl.
CPC .............. *G06V 20/44* (2022.01); *G06V 10/70* (2022.01); *G06V 20/56* (2022.01); *H04N 21/234381* (2013.01); *H04W 4/44* (2018.02)

(58) Field of Classification Search
CPC ........ G06V 20/44; G06V 10/70; G06V 20/56; H04N 21/234381; H04W 4/44
See application file for complete search history.

(56) References Cited

U.S. PATENT DOCUMENTS 11,770,505 B1 *  9/2023  Nguyen ................... H04N 7/18
                                                     348/148
2019/0012332 A1    1/2019  Newman et al.

FOREIGN PATENT DOCUMENTS

CN          203520470 U      4/2014

OTHER PUBLICATIONS

Search Report appended to an Office Action, which was issued to Taiwanese counterpart application No. 112131114 by the TIPO on Jul. 29, 2024, with an English translation thereof.

* cited by examiner

*Primary Examiner* — Girumsew Wendmagegn
(74) *Attorney, Agent, or Firm* — Blank Rome LLP

(57)          ABSTRACT

A driving recorder includes a capturing module, a communication module, a storage medium, and a processor. The capturing module is configured to capture a driving video. The communication module is configured to communicate with a server using wireless communication technology. The storage medium is configured to store the driving video. The processor is electrically connected to the capturing module, the communication module and the storage medium, and is configured to, when determining that a weather condition meets a predetermined condition, upload a time-lapse video to the server through the communication module, where the time-lapse video is related to the driving video.

18 Claims, 2 Drawing Sheets

1

DRIVING RECORDER AND METHOD FOR STORING VIDEO

CROSS-REFERENCE TO RELATED APPLICATION

This application claims priority to Taiwanese Invention patent application No. 112131114, filed on Aug. 18, 2023, the entire disclosure of which is incorporated by reference herein.

FIELD

The disclosure relates to a driving recorder and a method for storing video.

BACKGROUND

A driving recorder is a recording device installed on a vehicle, and is configured to record and store a driving video (usually an image in front of the vehicle) once the driving recorder is turned on. The driving video stored in the driving recorder may be used as an evidence if a traffic accident occurs.

A conventional driving recorder typically stores the driving video in a memory card therein (e.g., a secure digital (SD) card). However, the SD card may be damaged during the traffic accident, especially when the traffic accident involves a large impact force or fire. In poor weather conditions, traffic accidents are more likely to occur, which could lead to damage to the SD card, thereby potentially causing loss of the driving video stored in the SD card.

A conventional method to avoid losing the driving video is to connect the conventional driving recorder to a server, so that the driving video may be uploaded to the server as a backup in case the driving video stored in the SD card is lost or damaged in the traffic accident. However, since data size of the driving video is large, uploading the entire driving video to the server might not be easily affordable.

SUMMARY

Therefore, an object of the disclosure is to provide a driving recorder and a method for storing video that can alleviate at least one of the drawbacks of the prior art.

According to the disclosure, a driving recorder includes a capturing module, a communication module, a storage medium, and a processor. The capturing module is configured to capture a driving video. The communication module is configured to communicate with a server using wireless communication technology. The storage medium is configured to store the driving video. The processor is electrically connected to the capturing module, the communication module and the storage medium, and is configured to, when determining that a weather condition meets a predetermined condition, upload a time-lapse video to the server through the communication module, where the time-lapse video is related to the driving video.

According to the disclosure, a method for storing video adapted for a driving recorder and a server is provided. The driving recorder includes a capturing module, a communication module, a storage medium, and a processor. The driving recorder communicates with the server through the communication module. The method includes: the capturing module capturing a driving video; the storage medium storing the driving video; and in response to determining that a weather condition meets a predetermined condition, the processor uploading a time-lapse video to the server through the communication module, where the time-lapse video is related to the driving video.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
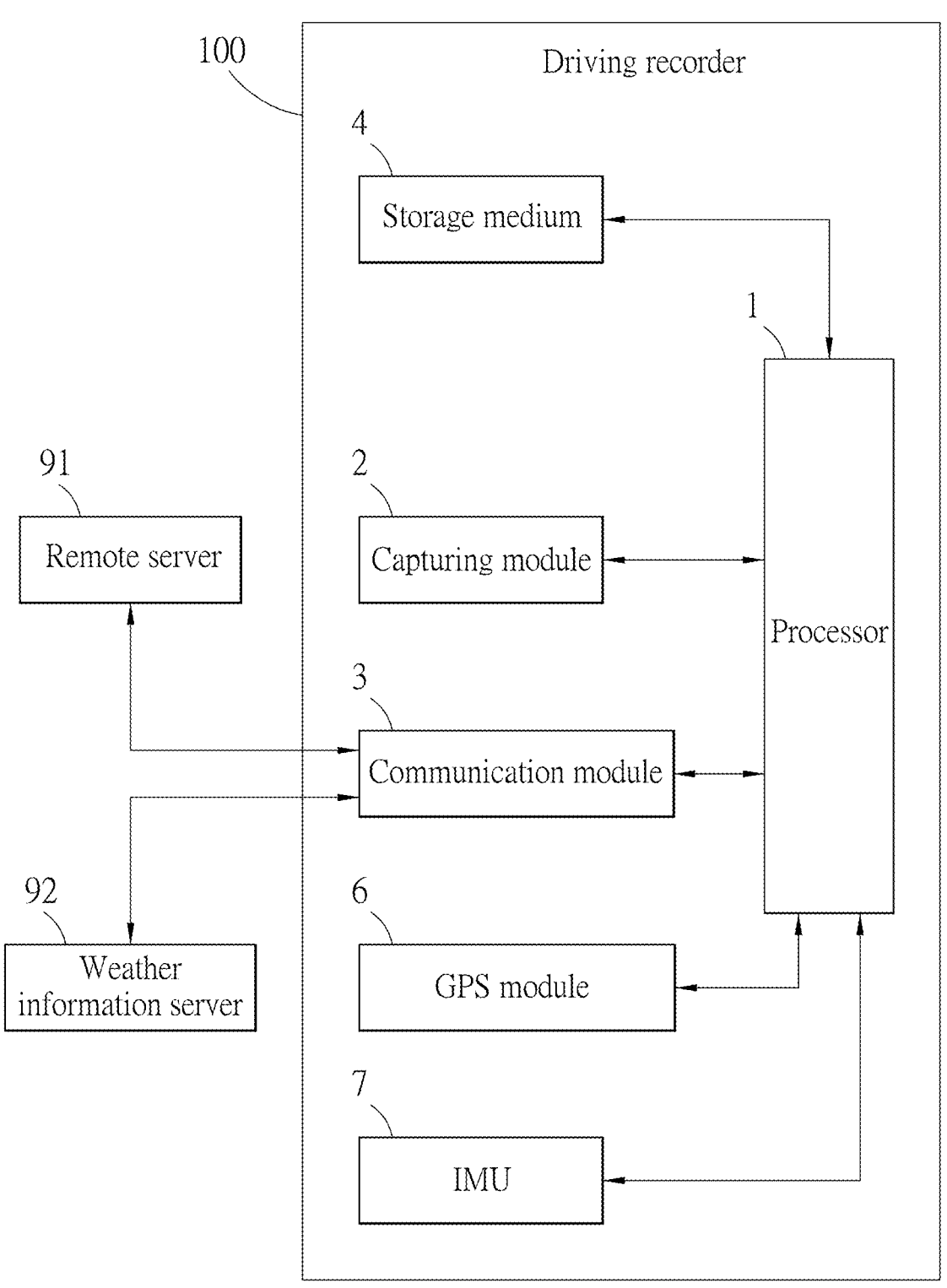
FIG. 1 is a block diagram illustrating a driving recorder according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, a driving recorder 100 according to an embodiment of the disclosure is adapted to communicate with a remote server 91 and a weather information server 92. The driving recorder 100 includes a processor 1, and a capturing module 2, a communication module 3, a storage medium 4, a global positioning system (GPS) module 6 and an inertial measurement unit (IMU) 7 that are electrically connected to the processor 1.

The capturing module 2 is a camera including, for example, a photographic lens and an image sensor. The driving recorder 100 is disposed on a vehicle (not shown), and is configured to capture a driving video, such as an image in front of the vehicle. The communication module 3 is configured to communicate with the remote server 91 and the weather information server 92 using wireless communication technology (e.g., third generation (3G), fourth generation (4G) or fifth generation (5G) of the wireless mobile telecommunications technology, or Wi-Fi). The storage medium 4 is configured to store the driving video, and may be implemented as a memory card (e.g., a secure digital (SD) card). The IMU 7 is configured to measure an axial angular velocity and an axial acceleration about the vehicle. Once the driving recorder 100 is turned on, the processor 1 controls the capturing module 2 to capture the driving video, and stores the driving video to the storage medium 4.

In this embodiment, the processor 1 is configured to perform image recognition on the driving video, to determine a weather condition of a current time, and to determine whether the weather condition meets a predetermined condition. When the processor 1 determines that the weather condition meets the predetermined condition, the processor 1 uploads a time-lapse video to the remote server 91 through the communication module 3, where the time-lapse video is related to the driving video.

The predetermined condition is related to a level of rain, a level of snow, a level of dust, or a level of fog. When the weather condition of the current time has met the predetermined condition, it means that the vehicle is driving in a bad weather condition (e.g., moderate to heavy rain, moderate to heavy snow, heavy dust, or dense fog).

To describe in further detail, the processor 1 obtains a determination score related to the weather condition of the current time by inputting successive frames of the driving video into a deep learning model. The deep learning model may be ResNet50, which uses a residual learning mechanism to avoid degradation problem when a large number of layers are used in the deep learning model, and is therefore capable of performing image recognition for the large number of layers with high accuracy. However, the deep learning model of the disclosure may be any image recognition deep learning model, and is not limited to be ResNet50.

In this embodiment, ResNet50 is trained with different weather categories including clear, cloudy, rainy, foggy, snowy, dusty, etc. Each of the different weather categories may be further divided into several sub-categories depending on user needs. The sub-categories of each weather categories are related to the level of that weather category (i.e., the level of rain, the level of snow, the level of dust, or the level of fog). For example, the rainy category may be further divided into light rain, moderate rain, and heavy rain; the snowy category may be further divided into light snow, moderate snow, and heavy snow; the dusty category may be further divided into slight dust and heavy dust; the foggy category may be further divided into slight fog and dense fog, but the disclosure is not limited to such.

In one example, the frames of the driving video may be divided into a plurality of sets, and each of the sets includes, for example, fifteen of the frames. For each of the sets, the processor 1 performs image recognition on each of the frames in the set so as to obtain the weather sub-category that corresponds to each of the frames, and determines the weather sub-category for the set to be one of the different weather sub-categories to which most of the frames in the set correspond. Then, the processor 1 determines the weather sub-categories corresponding respectively to those of the sets that are close to the current time, and further determines the weather condition of the current time (e.g., to be one of the weather sub-categories to which most of the sets correspond).

It should be noted that, when the vehicle is driving in the rain, raindrops would form small droplets on the windshield. Depending on the level of rain, there may be larger droplets or water flows on the windshield. The deep learning model may determine the level of rain to be one of the rainy sub-categories based on patterns of the droplets on the windshield or formation time of the droplets. Finally, the deep learning model outputs the determination score that is related to the weather condition of the current time.

The determination score may range from 0 to 1, and lies within one of a plurality of score ranges that correspond respectively to the different weather categories (or their sub-categories). For example, the score ranges may correspond to clear sky, cloudy, light rain, moderate rain, heavy rain, foggy, snowy, and dusty, respectively.

In one example, when the determination score obtained by the processor 1 (i.e., by the deep learning model) is equal to 0.679, which lies within one of the score ranges that corresponds to cloudy (e.g., 0.65-0.8), the weather condition of the current time is determined to be cloudy, which does not meet the predetermined condition. In another example, when the determination score obtained by the processor 1 is equal to 0.509, which lies within one of the score ranges that corresponds to moderate rain (e.g., 0.5-0.65), the weather condition of the current time is determined to be moderate rain, which meets the predetermined condition.

In some embodiments, when the processor 1 determines that a preset count (e.g., 3 counts) of determination scores that are consecutively obtained by the deep learning model converge to a predetermined score, which may be within one of the score ranges corresponding to a bad weather that is related to one of fog, rain, snow and dust, the processor 1 may determine that the weather condition of the current time has met the predetermined condition. That is to say, when the weather condition of the current time converges to the bad weather, the processor 1 may determine that the predetermined condition is met.

In one example, when three determination scores consecutively obtained by the deep learning model are respectively equal to 0.71, 0.69, and 0.675, which converge to 0.65 (within one of the score ranges corresponding to moderate rain) consecutively for three times, the weather condition of the current time is determined to have met the predetermined condition.

It should be noted that the three determination scores may be determined to be converging to the predetermined score based on a preset difference. That is to say, when differences between the predetermined score and each of the three determination scores gradually decrease, and when a difference between any adjacent two of the determination scores is less than or equal to the preset difference (e.g., 0.2), the three determination scores are determined to be converging to the predetermined score.

In some embodiments, the processor 1 adjusts the weather condition obtained by the deep learning model based on a visibility index. In one example, when the processor 1 determines that the weather condition determined by the deep learning model is an unstable weather condition (e.g., dusty or foggy) which the deep learning model is more likely to determine incorrectly, the processor 1 performs image recognition on at least one of the frames of the driving video, so as to obtain the visibility index. In another example, regardless of the weather condition, the processor 1 performs image recognition to obtain the visibility index.

In this embodiment, the visibility index is obtained using a grayscale contrast method disclosed by Tai-Ling Tsai in "An Experiment Method of Evaluating the Digital Image Processing Schemes for Measuring Atmospheric Visibility Index." The grayscale contrast method includes the following steps of: 1) obtaining a target average brightness and a background average brightness from the driving video; 2) subtracting the background average brightness from the target average brightness to obtain a subtracted brightness; 3) dividing the subtracted brightness by the background average brightness to obtain an image grayscale; 4) multiplying a global dynamic range, a local dynamic range, and the image grayscale respectively by three predetermined weight parameters so as to obtain three multiplied values; and 5) calculating a sum of the three multiplied values, where the sum is defined to be the visibility index. However, a method for obtaining the visibility index is not limited to such.

The processor 1 is configured to adjust the weather condition obtained by the deep learning model based on the visibility index. In one example, the weather condition obtained by the deep learning model corresponds to either slight dust or slight fog. When the visibility index obtained by the processor 1 is smaller than a first threshold (e.g., 800 meters) and greater than a second threshold (e.g., 500 meters), the visibility index corresponds to either slight dust or slight fog, and the processor 1 may determine that the weather condition obtained by the deep learning model is accurate and may remain unchanged. When the visibility index obtained by the processor 1 is smaller than a third threshold (e.g., 200 meters), the visibility index corresponds to either heavy dust or dense fog, and the processor 1 may determine that the weather condition obtained by the deep learning model is inaccurate (i.e., misjudged to be less intense) and may adjust the weather condition to be another weather condition that corresponds to a lower visibility (i.e., adjust to heavy dust or dense fog instead of slight dust or slight fog), which meets the predetermined condition. It should be noted that the first threshold is greater than the second threshold, and the second threshold is greater than the third threshold, and that different visibility indices corresponding to the different weather categories are predetermined by experiments and observations.

In some embodiments, the processor 1 is further configured to obtain a plurality of visibility indices by performing image recognition on multiple ones of the frames of the driving video. When the processor 1 determines that a plurality of drops in the visibility indices occur consecutively over a predetermined period, and that each of the drops in the visibility indices reaches a drop threshold (e.g., 250 meters), it means that the visibility is dropping rapidly, and the processor 1 may adjust the weather condition obtained by the deep learning model to be another weather condition that corresponds to a lower visibility.

That is to say, when the weather condition obtained by the deep learning model is inaccurate (or is converging to the predetermined condition but has not yet met the predetermined condition), and is therefore determined by the deep learning model to have not met the predetermined condition, the processor 1 may adjust the weather condition currently determined based on the visibility index. As such, the time-lapse video may be uploaded to the remote server 91 through the communication module 3 in advance of a bad weather condition. This may prove useful, especially for the weather categories such as dusty and foggy where the level of dust and the level of fog may be hard to determine in the driving video.

In some embodiments, the processor 1 may obtain geographical coordinate information through the GPS module 6, and send the geographical coordinate information to the weather information server 92 through the communication module 3, so as to obtain the weather condition of the current time. The weather information server 92 may be an open source weather forecasting database.

In some embodiments, since a driving speed of the vehicle may vary depending on a road type that the vehicle is driving on, and both of the driving speed of the vehicle and the road type may cause the traffic accident to have different severity, the processor 1 may be configured to upload the time-lapse video to the remote server 91 further according to the driving speed and the road type.

The processor 1 is configured to obtain the driving speed based on the geographical coordinate information obtained through the GPS module 6, and to determine whether the road type is a regular road (which typically includes traffic lights, pedestrians, parked vehicles, etc.) or a high-speed road (e.g., a highway, a freeway, an express way, or any roads that have a high speed limit) by performing image recognition on the driving video. In one example, the processor 1 may determine that the road type is the regular road when a traffic light or a crosswalk appears in the driving video within a predetermined distance, and may determine that the road type is the high-speed road when neither the traffic light nor the cross walk appears in the driving video within the predetermined distance.

In some embodiments, the processor 1 may determine the road type based on the axial angular velocity and the axial acceleration measured by the IMU 7. For example, in countries where high-speed roads are usually elevated compared to regular roads, the processor 1 may obtain a driving motion of the vehicle based on the axial angular velocity and the axial acceleration, and when the processor 1 determines that the driving motion conforms with a predetermined change in altitude (such as when the vehicle is driving uphill toward the high-speed road), the processor 1 may determine that the road type is the high-speed road; otherwise, the processor 1 may determine that the road type is the regular road. Furthermore, the processor 1 may determine the road type based on the geographical coordinate information, traffic signs, etc. Since methods for determining the road type is well known to one having ordinary skill in the art, it will not be described in further detail for the sake of brevity.

In some embodiments, the processor 1 may control the capturing module 2 to directly capture the time-lapse video starting from a predetermined trigger time. In some embodiments, the processor 1 may convert the driving video into the time-lapse video using a time-lapse photography technology, and the time-lapse video may be, for example, a portion of the driving video that is recorded since the predetermined trigger time and that is fixed in length. The predetermined trigger time may be, for example, a time point when the processor 1 determines that the weather condition meets the predetermined condition, or another time point when the processor 1 determines that the weather condition is converging to the predetermined condition.

It should be noted that the time-lapse video is obtained by compressing the driving video. Specifically, the time-lapse video is obtained by reducing a frame rate of the driving video, so as to compress a duration of the driving video, and the time-lapse video is thus generated to be, for example, 60 seconds in length. Moreover, the processor 1 is configured to determine, based on the driving speed of the vehicle and the road type, a video duration and an upload frequency for the time-lapse video. Specifically, the video duration corresponds to a shorter duration (i.e., a degree of time-lapse of the time-lapse video is lower) and the upload frequency is higher for driving environments with higher risks.

In one example, when the processor 1 determines that the weather condition of the current time meets the predetermined condition, that the road type is the regular road, and that the driving speed is greater than a first predetermined speed (e.g., 40 km/hr), the processor 1 uploads a compressed video as the time-lapse video to the remote server 91 every a first time period (e.g., 6 minutes). Specifically, the compressed video is obtained by the processor 1 by reducing a number of frames (i.e., the frame rate) of the driving video in a manner that every minute of the driving video is presented in the compressed video for a first duration (e.g., 10 seconds) that is less than one minute. In such a case, six minutes of the driving video is compressed to one minute in the compressed video. It should be noted that the processor 1 obtains the compressed video by processing a portion of the driving video that is last captured by the capturing module 2 and that has a duration equal to the first time period.

In another example, when the processor 1 determines that the weather condition of the current time meets the predetermined condition, that the road type is the high-speed road, and that the driving speed is greater than a second predetermined speed (e.g., 75 km/hr) and smaller than a third predetermined speed (e.g., 90 km/hr), the processor 1 uploads another compressed video as the time-lapse video to the remote server 91 every a second time period (e.g., 4 minutes). Specifically, the another compressed video is obtained by the processor 1 by reducing the frame rate of the driving video in a manner that every minute of the driving video is presented in the compressed video for a second duration (e.g., 15 seconds) that is less than one minute. It should be noted that the processor 1 obtains the another compressed video by processing another portion of the driving video that is last captured by the capturing module 2 and that has a duration equal to the second time period.

In yet another example, when the processor 1 determines that the weather condition of the current time meets the predetermined condition, that the road type is the high-speed road, and that the driving speed is greater than the third predetermined speed, the processor 1 uploads yet another compressed video as the time-lapse video to the remote server 91 every a third time period (e.g., 2 minutes). Specifically, the yet another compressed video is obtained by the processor 1 by reducing the frame rate of the driving video in a manner that every minute of the driving video is presented in the compressed video for a third duration (e.g., 30 seconds) that is less than one minute. It should be noted that the processor 1 obtains the yet another compressed video by processing yet another portion of the driving video that is last captured by the capturing module 2 and that has a duration equal to the third time period. It should be noted that the third predetermined speed may be set close to an upper speed limit of the high-speed road and is greater than the second predetermined speed, and the second predetermined speed is greater than the first predetermined speed; the first time period is longer than the second time period, and the second time period is longer than the third time period; the first duration is shorter than the second duration, and the second duration is shorter than the third duration.

That is to say, based on the road type and the driving speed of the vehicle, the upload frequency for the time-lapse video and the degree of reduction in the frame rate of the driving video are different. When the road type is the high-speed road, compared to the regular road, the driving speed of the vehicle on the high-speed road is likely to be greater, and a risk of having a traffic accident is also be greater. Since there is a lower chance of obtaining other video records of the traffic accident on the high-speed road (concentration of traffic cameras is not as high as in the general road), the degree of reduction in the frame rate of the driving video is set to be lower, so as to ensure that when the risk of having a traffic accident is increased due to the bad weather condition, the time-lapse video maintains information in the driving video to a greater extent without increasing the data size of the driving video too much. Furthermore, the driving video may be lost or damaged during the traffic accident (e.g., from large impact) since the driving speed of the vehicle is greater on the high-speed road; therefore, the upload frequency for the time-lapse video to the remote server 91 is also set to be higher (compared to the regular road). Similarly, when the driving speed of the vehicle is close to the upper speed limit of the high-speed road, the frame rate of the driving video is further reduced and the upload frequency for the time-lapse video is further increased.

Figure 2:
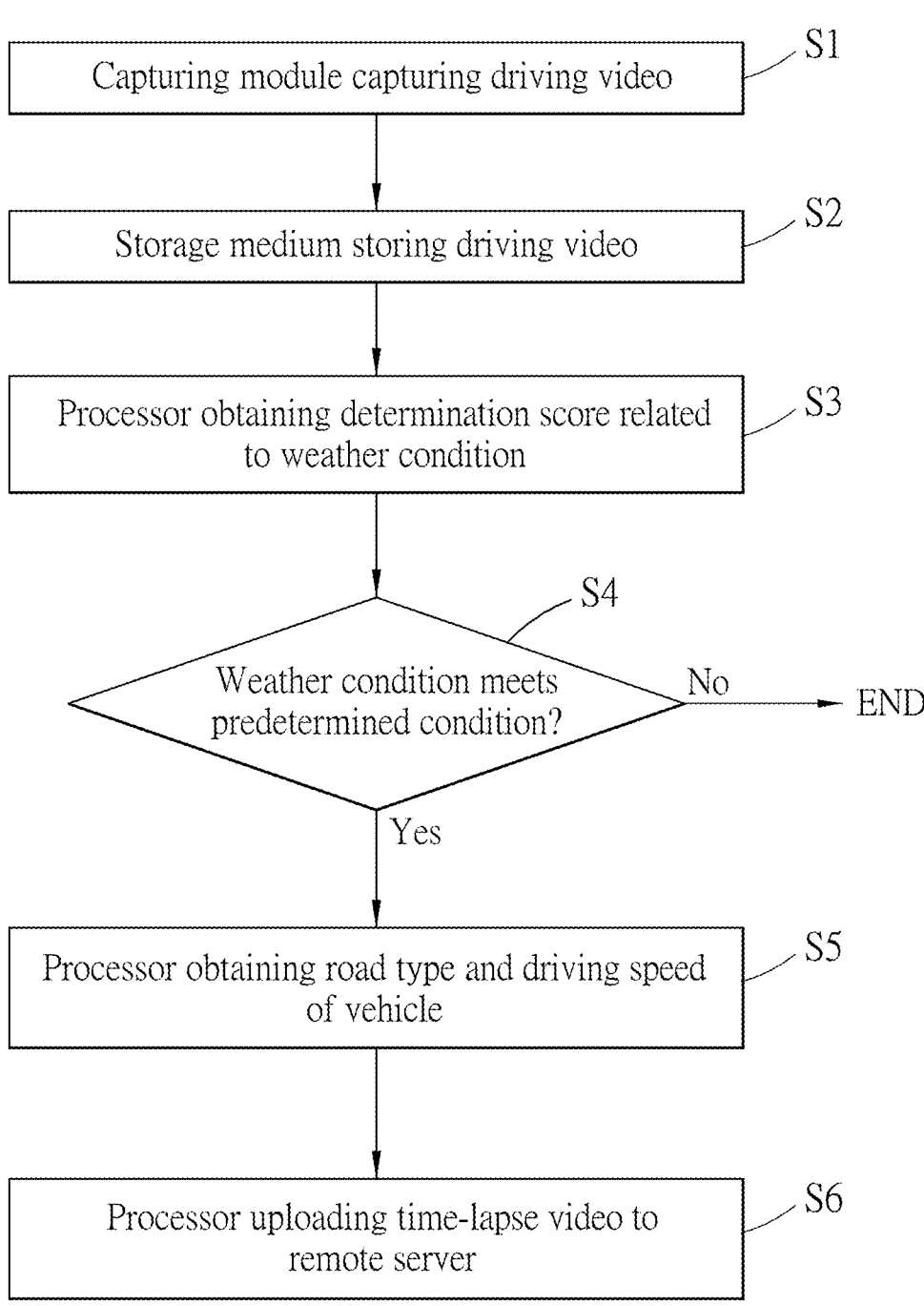
FIG. 2 is a flow chart illustrating a method for storing video according to an embodiment of the disclosure.

Referring further to FIG. 2, according to another embodiment of the disclosure, a method for storing video is adapted to the driving recorder 100, and a flow of the method includes steps S1 to S6.

In step S1, the capturing module 2 captures the driving video.

In step S2, the storage medium 4 stores the driving video captured by the capturing module 2.

In step S3, the processor 1 obtains the determination score related to the weather condition of the current time by inputting the frames of the driving video into the deep learning model.

In some embodiments, before step S4, the processor 1 obtains the visibility index by performing image recognition for one of the frames of the driving video, and in response to determining that the visibility index is smaller than the threshold, the processor 1 adjusts the weather condition obtained by the deep learning model to be another weather condition that corresponds to a lower visibility.

In some embodiments, before step S4, the processor 1 obtains the visibility indices by performing image recognition for multiple ones of the frames of the driving video, and in response to determining that the drops in the visibility indices occurred consecutively over the predetermined period, and that each of the drops in the visibility indices reaches the threshold, the processor 1 adjusts the weather condition obtained by the deep learning model to be another weather condition that corresponds to a lower visibility.

In step S4, the processor 1 determines whether the weather condition meets the predetermined condition. When the weather condition meets the predetermined condition, the flow of the method proceeds to step S5; otherwise, the flow of the method ends. It should be noted that the processor 1 may determine that the predetermined condition is met when the weather condition meets the predetermined condition, or when the weather condition is converging to the predetermined condition (i.e., when the preset count of determination scores that are consecutively obtained by the deep learning model converge to the predetermined score).

In step S5, the processor 1 performs image recognition based on the driving video and the geographical coordinate information that is obtained by the GPS module 6, so as to obtain the road type and the driving speed of the vehicle. Specifically, the processor 1 determines whether the road type is the regular road or the high-speed road based on the driving video, and the processor obtains the driving speed based on the geographical coordinate information.

In some embodiments, step S5 may be performed before step S4, or may be performed simultaneously as step S4.

In step S6, the processor 1 uploads the time-lapse video to the remote server 91 by the communication module 3, where the video duration and the upload frequency for the time-lapse video is determined based the road type and the driving speed of the vehicle.

To describe in further detail, in one condition, when the processor 1 determines that the weather condition meets the predetermined condition, that the road type is the regular road, and that the driving speed is greater than the first predetermined speed, the processor 1 uploads the compressed video as the time-lapse video to the remote server 91 every the first time period (e.g., 6 minutes). In another condition, when the processor 1 determines that the weather condition meets the predetermined condition, that the road type is the high-speed road, and that the driving speed is greater than the second predetermined speed and smaller than the third predetermined speed, the processor 1 uploads the another compressed video as the time-lapse video to the remote server 91 every the second time period (e.g., 4 minutes). In yet another condition, when the processor 1 determines that the weather condition meets the predetermined condition, that the road type is the high-speed road, and that the driving speed is greater than the third predetermined speed, the processor 1 uploads the yet another compressed video as the time-lapse video to the remote server 91 every the third time period (e.g., 2 minutes).

In summary, according to the disclosure, the driving recorder 100 is configured to, when the weather condition currently determined meets the predetermined condition, dynamically adjust the duration and the upload frequency for the time-lapse video based on the driving speed and the road type, so as to ensure that when a traffic accident occurs, the time-lapse video capturing scenes of the traffic accident is stored in the remote server 91 even if the storage medium 4 in the driving recorder 100 is damaged. Specifically, instead of uploading the time-lapse video to the remote server 91 only when determining that the weather condition is a bad weather condition based on one determination score, the processor 1 may also upload the time-lapse video to the remote server 91 when determining that the weather condition shows a trend toward a bad weather condition based on multiple determination scores, or when determining that the weather condition after being adjusted based on the visibility index meets the predetermined condition. As such, when the weather condition is rapidly shifting between a normal weather condition and close to a bad weather condition, the time-lapse video may also be uploaded to the remote server 91 in advance of a bad weather condition or when the weather condition is misjudged to have not met the predetermined condition.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A driving recorder, comprising:
a capturing module configured to capture a driving video;
a communication module configured to communicate with a server using wireless communication technology;
a storage medium configured to store the driving video; and
a processor electrically connected to said capturing module, said communication module and said storage medium, and configured to, when determining that a weather condition meets a predetermined condition, upload a time-lapse video to the server through said communication module, where the time-lapse video is related to the driving video,
wherein said processor is further configured to obtain a determination score related to the weather condition by inputting successive frames of the driving video into a deep learning model, and
wherein said processor is configured to determine that the predetermined condition is met when a preset count of determination scores that are consecutively obtained by the deep learning model converge to a predetermined score, where the predetermined score corresponds to a bad weather condition that is related to one of fog, rain, snow and dust.

2. The driving recorder as claimed in claim 1, wherein:
said processor is further configured to obtain a visibility index by performing image recognition for one of the frames of the driving video; and
said processor is further configured to, when determining that the visibility index is smaller than a threshold, adjust the weather condition obtained by the deep learning model to be another weather condition that corresponds to a lower visibility.

3. The driving recorder as claimed in claim 1, wherein:
said processor is further configured to obtain a plurality of visibility indices by performing image recognition for multiple ones of the frames of the driving video; and
said processor is further configured to, when determining that a plurality of drops in the visibility indices occurred consecutively over a predetermined period, and that each of the drops in the visibility indices reaches a threshold, adjust the weather condition obtained by the deep learning model to be another weather condition that corresponds to a lower visibility.

4. The driving recorder as claimed in claim 1, further comprising a global positioning system (GPS) module electrically connected to said processor and configured to obtain geographical coordinate information,
wherein said processor is further configured to determine whether a road type is a regular road or a high-speed road based on the driving video, to obtain a driving speed based on the geographical coordinate information, and to determine, based on the driving speed and the road type, a video duration and an upload frequency for the time-lapse video.

5. The driving recorder as claimed in claim 4, wherein said processor is configured to, when determining that the weather condition meets the predetermined condition, that the road type is the regular road, and that the driving speed is greater than a first predetermined speed, upload, to the server, a compressed video as the time-lapse video every a first time period, where the compressed video is obtained by reducing a number of frames of the driving video in a manner that every minute of the driving video is presented in the compressed video for a first duration that is less than one minute, and where the driving video is last captured by said capturing module and has a duration equal to the first time period.

6. The driving recorder as claimed in claim 4, wherein said processor is configured to, when determining that the weather condition meets the predetermined condition, that the road type is the high-speed road, and that the driving speed is greater than a second predetermined speed and slower than a third predetermined speed, upload, to the server, a compressed video as the time-lapse video every a second time period, where the compressed video is obtained by reducing a number of frames of the driving video in a manner that every minute of the driving video is presented in the compressed video for a second duration that is less than one minute, and where the driving video is last captured by said capturing module and has a duration equal to the second time period.

7. The driving recorder as claimed in claim 6, wherein said processor is configured to, when determining that the weather condition meets the predetermined condition, that the road type is the high-speed road, and that the driving speed is greater than the third predetermined speed, upload, to the server, another compressed video as the time-lapse video every a third time period, where the another compressed video is obtained by reducing the number of frames of the driving video in a manner that every minute of the driving video is presented in the compressed video for a third duration that is less than one minute, and where the driving video is last captured by said capturing module and has a duration equal to the third time period.

8. A method for storing video adapted for a driving recorder and a server, the driving recorder including a capturing module, a communication module, a storage medium, and a processor, the driving recorder communicating with the server through the communication module, the method comprising:

the capturing module capturing a driving video;

the storage medium storing the driving video;

in response to determining that a weather condition meets a predetermined condition, the processor uploading a time-lapse video to the server through the communication module, where the time-lapse video is related to the driving video; and before uploading the time-lapse video to the server, the processor obtaining a determination score related to the weather condition by inputting successive frames of the driving video into a deep learning model, wherein the processor determines that the predetermined condition is met when a preset count of determination scores that are consecutively obtained by the deep learning model converge to a predetermined score, where the predetermined score corresponds to a bad weather condition that is related to one of fog, rain, snow and dust.

9. The method as claimed in claim 8, wherein obtaining the weather condition includes:

the processor obtaining a visibility index by performing image recognition for one of the frames of the driving video; and in response to determining that the visibility index is smaller than a threshold, the processor adjusting the weather condition obtained by the deep learning model to be another weather condition that corresponds to a lower visibility.

10. The method as claimed in claim 8, wherein obtaining the weather condition includes:

the processor obtaining a plurality of visibility indices by performing image recognition for multiple ones of the frames of the driving video; and in response to determining that a plurality of drops in the visibility indices occurred consecutively over a predetermined period, and that each of the drops in the visibility indices reaches a threshold, the processor adjusting the weather condition obtained by the deep learning model to be another weather condition that corresponds to a lower visibility.

11. The method as claimed in claim 8, the driving recorder further including a global positioning system (GPS) module that obtains geographical coordinate information, wherein uploading the time-lapse video to the server includes:

the processor determining whether a road type is a regular road or a high-speed road based on the driving video;

the processor obtaining a driving speed based on the geographical coordinate information; and the processor determining, based on the driving speed and the road type, a video duration and an upload frequency for the time-lapse video.

12. The method as claimed in claim 11, wherein uploading the time-lapse video to the server further includes, in response to determining that the weather condition meets the predetermined condition, that the road type is the regular road, and that the driving speed is greater than a first predetermined speed, the processor uploading, to the server, a compressed video as the time-lapse video every a first time period, where the compressed video is obtained by reducing a number of frames of the driving video in a manner that every minute of the driving video is presented in the compressed video for a first duration that is less than one minute, and where the driving video is last captured by said capturing module and has a duration equal to the first time period.

13. The method as claimed in claim 11, wherein uploading the time-lapse video to the server further includes, in response to determining that the weather condition meets the predetermined condition, that the road type is the high-speed road, and that the driving speed is greater than a second predetermined speed and slower than a third predetermined speed, the processor uploading, to the server, a compressed video as the time-lapse video every a second time period, where the compressed video is obtained by reducing a number of frames of the driving video in a manner that every minute of the driving video is presented in the compressed video for a second duration that is less than one minute, and where the driving video is last captured by said capturing module and has a duration equal to the second time period.

14. The method as claimed in claim 13, wherein uploading the time-lapse video to the server further includes, in response to determining that the weather condition meets the predetermined condition, that the road type is the high-speed road, and that the driving speed is greater than the third predetermined speed, the processor uploading, to the server, another compressed video as the time-lapse video every a third time period, where the another compressed video is obtained by reducing the number of frames of the driving video in a manner that every minute of the driving video is presented in the compressed video for a third duration that is less than one minute, and where the driving video is last captured by said capturing module and has a duration equal to the third time period.

15. A driving recorder, comprising:

a capturing module configured to capture a driving video;

a communication module configured to communicate with a server using wireless communication technology;

a storage medium configured to store the driving video;

a processor electrically connected to said capturing module, said communication module and said storage medium, and configured to, when determining that a weather condition meets a predetermined condition, upload a time-lapse video to the server through said communication module, where the time-lapse video is related to the driving video; and a global positioning system (GPS) module electrically connected to said processor and configured to obtain geographical coordinate information, wherein said processor is further configured to determine whether a road type is a regular road or a high-speed road based on the driving video, to obtain a driving speed based on the geographical coordinate information, and to determine, based on the driving speed and the road type, a video duration and an upload frequency for the time-lapse video.

16. The driving recorder as claimed in claim 15, wherein said processor is configured to, when determining that the weather condition meets the predetermined condition, that the road type is the regular road, and that the driving speed is greater than a first predetermined speed, upload, to the server, a compressed video as the time-lapse video every a first time period, where the compressed video is obtained by reducing a number of frames of the driving video in a manner that every minute of the driving video is presented in the compressed video for a first duration that is less than one minute, and where the driving video is last captured by said capturing module and has a duration equal to the first time period.

17. The driving recorder as claimed in claim 15, wherein said processor is configured to, when determining that the weather condition meets the predetermined condition, that the road type is the high-speed road, and that the driving speed is greater than a second predetermined speed and slower than a third predetermined speed, upload, to the server, a compressed video as the time-lapse video every a second time period, where the compressed video is obtained by reducing a number of frames of the driving video in a manner that every minute of the driving video is presented in the compressed video for a second duration that is less than one minute, and where the driving video is last captured by said capturing module and has a duration equal to the second time period.

18. The driving recorder as claimed in claim 17, wherein said processor is configured to, when determining that the weather condition meets the predetermined condition, that the road type is the high-speed road, and that the driving speed is greater than the third predetermined speed, upload, to the server, another compressed video as the time-lapse video every a third time period, where the another compressed video is obtained by reducing the number of frames of the driving video in a manner that every minute of the driving video is presented in the compressed video for a third duration that is less than one minute, and where the driving video is last captured by said capturing module and has a duration equal to the third time period.

* * * * *